(12) United States Patent
Jia et al.

(10) Patent No.: US 11,907,711 B2
(45) Date of Patent: Feb. 20, 2024

(54) FAST PORTING OF PROJECTS

(71) Applicant: International Business Machines Corporation, Armonk, NY (US)

(72) Inventors: Shuang Shuang Jia, Beijng (CN); Yi Chai, Beijing (CN); Xiao-Yu Li, Beijing (CN); Xin Zhao, Beijing (CN); Li Cao, BeiJing (CN); Jiangang Deng, Beijing (CN); Hua Wei Fan, Beijing (CN); Zhou Wen Ya, Beijing (CN); Hong Wei Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 17/319,450

(22) Filed: May 13, 2021

(65) Prior Publication Data

US 2022/0365778 A1    Nov. 17, 2022

(51) Int. Cl.
*G06F 8/76* (2018.01)
*G06F 8/77* (2018.01)
*G06F 8/75* (2018.01)

(52) U.S. Cl.
CPC .............. *G06F 8/76* (2013.01); *G06F 8/75* (2013.01); *G06F 8/77* (2013.01)

(58) Field of Classification Search
CPC .................................................. G06F 8/75–77
See application file for complete search history.

(56) References Cited

U.S. PATENT DOCUMENTS

| | | | |
|---|---|---|---|
| 6,983,446 B2 | 1/2006 | Charisius et al. | |
| 8,181,167 B2 | 5/2012 | Zhao | |
| 9,378,014 B2 | 6/2016 | Wilson et al. | |
| 9,977,673 B1 | 5/2018 | Friedkin et al. | |
| 2004/0055004 A1* | 3/2004 | Sun | G06F 9/4862 718/108 |
| 2006/0064683 A1* | 3/2006 | Bonsteel | G06F 9/45537 717/162 |
| 2016/0070569 A1 | 3/2016 | Gschwind et al. | |
| 2017/0161062 A1* | 6/2017 | Banerjee | G06F 11/3466 |
| 2020/0264919 A1* | 8/2020 | Vukovic | G06N 20/00 |

(Continued)

OTHER PUBLICATIONS

P. Seth, "Evaluate your open source application for porting to IBM Power Systems," IBM developer, Oct. 20, 2020, 8 Pages.

*Primary Examiner* — Thomas J Dailey
(74) *Attorney, Agent, or Firm* — CANTOR COLBURN LLP; Teddi Maranzano

(57) ABSTRACT

Aspects of the invention include systems and methods configured to efficiently evaluate the efforts of a code migration (e.g., porting task) between different platforms. A non-limiting example computer-implemented method includes receiving a function of a source platform. The function can include a plurality of fields. An initial vector is constructed for each of the plurality of fields. The initial vector encodes a value of the respective field according to an encoding rule. The initial vectors are merged into a single final vector and the final vector is classified into one of a plurality of system function families of the source platform. A vector of a target platform at a minimum distance to the final vector is identified and an assessment is provided that includes a difficulty in porting a project comprising the function between the source platform and the target platform based at least in part on the minimum distance.

20 Claims, 15 Drawing Sheets

(56) References Cited

U.S. PATENT DOCUMENTS

| | | |
|---|---|---|
| 2020/0272458 A1 | 8/2020 | Guan et al. |
| 2020/0326934 A1* | 10/2020 | Tepper .................. G06N 3/044 |
| 2020/0326935 A1* | 10/2020 | Hicks ........................ G06F 8/76 |
| 2023/0195435 A1* | 6/2023 | Jaeger ..................... G06F 8/427 |
| | | 717/143 |

* cited by examiner

Transform Vectors 304

Importance Matrix 702

| Field | Vector$_{IN}$ | | | Importance (0 ~ 1) | Vector$_{OUT}$ | | |
|---|---|---|---|---|---|---|---|
| Return Type | 1 | 3 | ... | 0 | 0.1 | 0 | 0 | ... | 0 |
| Parameters | 1 | 2 | ... | 0 | 0.1 | 0 | 0 | ... | 0 |
| Name | 12 | 13 | ... | 23 | 0.1 | 1 | 1 | ... | 2 |
| Description | 45 | 13 | ... | 23 | 1 | 45 | 13 | ... | 23 |
| Body | 56 | 13 | ... | 23 | 0.1 | 5 | 1 | ... | 2 |

FIG. 7

Porting Difficulty Report 1202

| Category | Source-Target ID | Recommendation | Count | Percentage |
|---|---|---|---|---|
| Same | func A – func A'<br>func B – func B'<br>func C – func C'<br>... | Do Nothing | 140 | 70% |
| Equivalent | func R – func R'<br>func S – func S'<br>func T – func T'<br>... | Replace Source Function with Target Function | 10 | 5% |
| Mismatched | func U – func U'<br>func V – func V'<br>func W – func W'<br>... | Fix Requirement | 10 | 5% |
| Missing | func X<br>func Y<br>func Z<br>... | New Requirement | 40 | 20% |

FIG. 12

FAST PORTING OF PROJECTS

BACKGROUND

The present invention generally relates to distributed computer systems, and more specifically, to computer systems, computer-implemented methods, and computer program products to quickly port projects (e.g., code migrations) between platforms in distributed and local environments.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In some configurations service providers offer access to Internet-based services hosted remotely by the provider. Service providers can provide hardware infrastructure or software applications to requesting clients through a computer network. Requesting clients can access the software applications using conventional client based "browser" software applications, where the software and data are stored on a server maintained by a cloud computing provider.

In some cases, a service provider does not have access to a requested application within the cloud computing environment. To gain access, one solution is to port the requested application from an available environment (e.g., offline or secondary operating system, client-side resource, etc.) to the cloud computing environment. Common porting scenarios include porting products across operating systems (Linux®, Unix®, iOS®, etc.) and/or hardware platforms (x86, s390®, Arm®, Riscv®, etc.). Porting applications from one environment to another is often time-consuming and difficult. For example, porting platform independent solutions from one cloud provider to another in one or more virtual images can be challenging because image formats can be specific to the hypervisor technology supported by the cloud computing environment itself. In addition, to meet cloud specific hypervisor requirements, a number of tedious manual configuration steps can be required in the target operating system.

SUMMARY

Embodiments of the present invention are directed to efficiently evaluating the efforts of a code migration (e.g., porting task) between different platforms. A non-limiting example method includes receiving a function of a source platform. The function can include a plurality of fields. An initial vector is constructed for each of the plurality of fields. The initial vector encodes a value of the respective field according to an encoding rule. The initial vectors are merged into a single final vector and the final vector is classified into one of a plurality of system function families of the source platform. A vector of a target platform at a minimum distance to the final vector is identified and an assessment is provided that includes a difficulty in porting a project comprising the function between the source platform and the target platform based at least in part on the minimum distance.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 illustrates an example vector transformation in accordance with one or more embodiments of the present invention;

FIG. 12 illustrates an example porting difficulty report made in accordance with one or more embodiments of the present invention;

DETAILED DESCRIPTION

Figure 1:
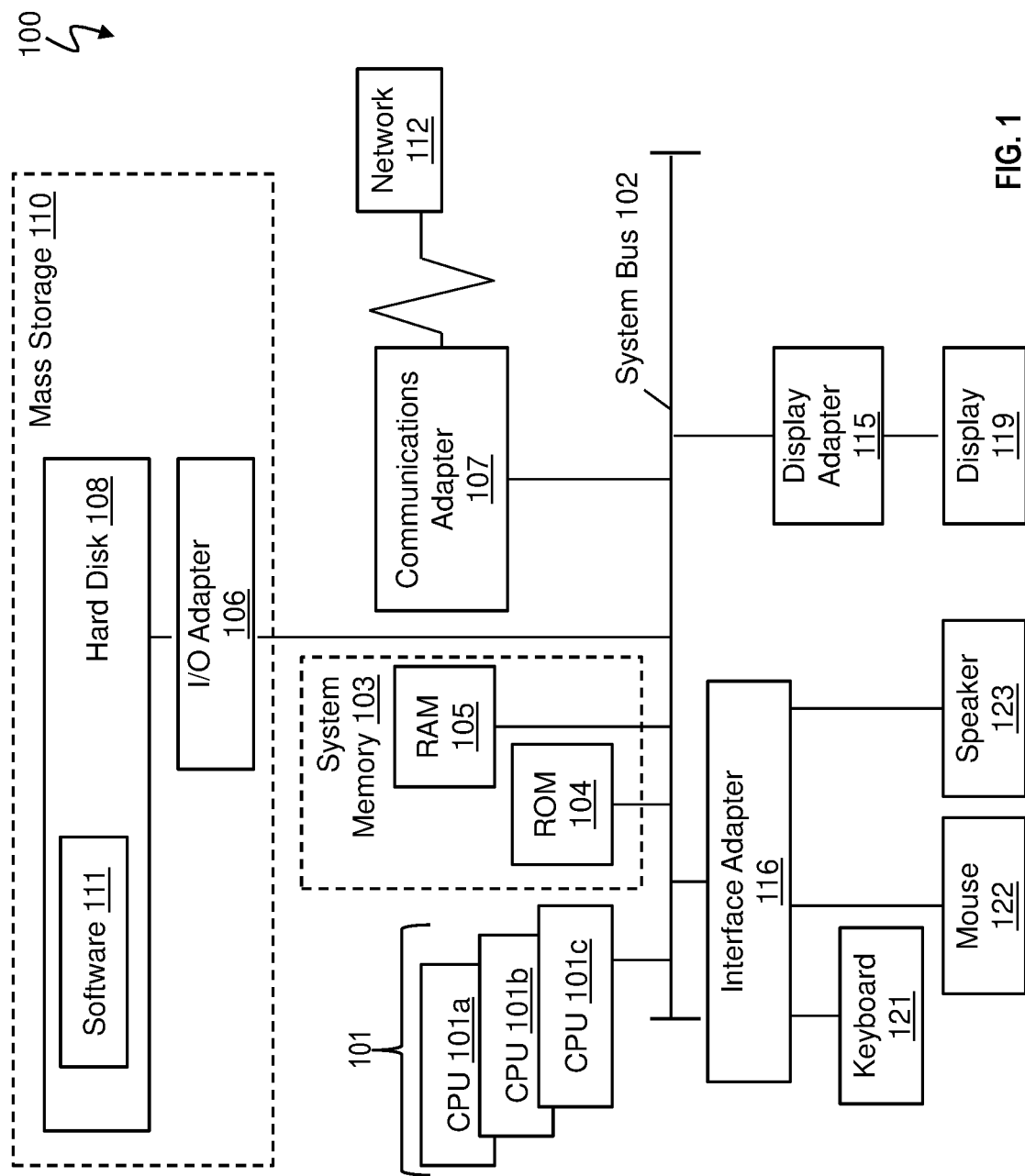
FIG. 1 depicts a block diagram of an example computer system for use in conjunction with one or more embodiments of the present invention.

Porting products across operating systems and/or hardware platforms is increasingly common as the access to open source resources continues to expand. Identifying and ensuring access to any required fundamental system functions for a ported product within the receiving environment is the basis of sound porting strategies. Currently, it takes large efforts to manually identify and verify a porting project's system requirements. For example, determining which, if any, system specific functions for the ported product are missing or mismatched in the target (destination) system is difficult. Complicating matters further, it is very important to verify access to these system specific functions as early as possible in the porting planning stages so that the feasibility and complexity of the porting work can be understood before any work is actually carried out. Currently, there is no effective way even for an experienced engineer to automate this manually intensive, slow, and expensive process.

One or more embodiments of the present invention address one or more of the above-described shortcomings by providing computer-implemented methods, computing systems, and computer program products configured to efficiently evaluate the efforts of a code migration (e.g., porting task) between different platforms. The main effort in a porting task of a project is finding out whether any system specific functions of the source operating system (OS) are missing or mismatched in the target system OS. There are four possible scenarios: (1) the system specific functions are the same; (2) the system specific functions are equivalent; (3) the system specific functions are mismatched; or (4) the system specific functions are wholly missing in the target OS.

An "equivalent function" as used herein refers to a function that is available within the target OS that, while not identical to a system specific function required by the porting project (i.e., within the source OS), can be swapped one-for-one with the system specific function without introducing errors. For example, consider two functions with the same input and output data types, but having different labels for each internal and external variable. A "mismatched function" as used herein refers to a function that is available within the target OS that includes some overlapping but incomplete functionality for a system specific function required by the porting project. For example, consider a source OS (e.g., z/OS) "mount" function: func Mount(path string, filesystem string, fstype string, mtm uint32, parmlen int32, parm string) and a target OS (e.g., Linux) "mount" function: func Mount(source string, target string, fstype string, flags uintptr, data string) and note that while some of the variables (e.g., path string in z/OS and source string in Linux) are equivalents, the variables "mtm uint32" and "parmlen int32" in the source OS do not have a clear equivalent in the target OS. Moreover, the target OS includes the additional variable "flags uintptr".

In some embodiments, the present porting platform provides functionality to dynamically handle any of the aforementioned scenarios. In some embodiments, functionality includes constructing feature vectors for each ported function. Feature vectors can include, for example, function elements such as the function's name, parameters, return type, and the function's description. Feature vectors in a chosen coordinate system can then be transformed using a default importance matrix by considering known operating system function families. For example, the "description" sub-vector can be assigned a higher importance (significance value) than a "return type" sub-vector.

In some embodiments of the invention, spatially adjacent vectors are classified into predetermined function groups. "Function groups" as used herein refer to the various function families into which all functions can be assigned, and can include, for example, File Manipulation, Information Management, Communication, Process Control, Device Manipulation, and Protection, although it should be understood that other function family types are possible. The most similar function groups can be mapped between source and target platforms.

In some embodiments of the invention, the function groups are refined in response to predetermined conditions by revising a customized importance matrix. For example, revising can be triggered if a statistical result of comparison between random sampling points and real values is not meeting expectations (e.g., below some predefined threshold of acceptability).

Advantageously, a porting system modified in this manner offers several technical solutions over conventional porting approaches. As an initial matter, the present system offers a relatively easy way to estimate a porting effort prior to actually undertaking the work. Moreover, the platform can identify candidate "most similar" functions to be used as starting points for mismatched or missing functions, streamlining the migration process without requiring manual review by a subject matter expert (SME). Moreover, the platform does not share the same type of experience-bias (i.e., which functions is the SME already familiar with?) as the subject matter expert and is able to source the "most similar" candidate functions without regard to any prior exposure/familiarity with those functions.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node (e.g., a node 10 of FIG. 9 below). Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
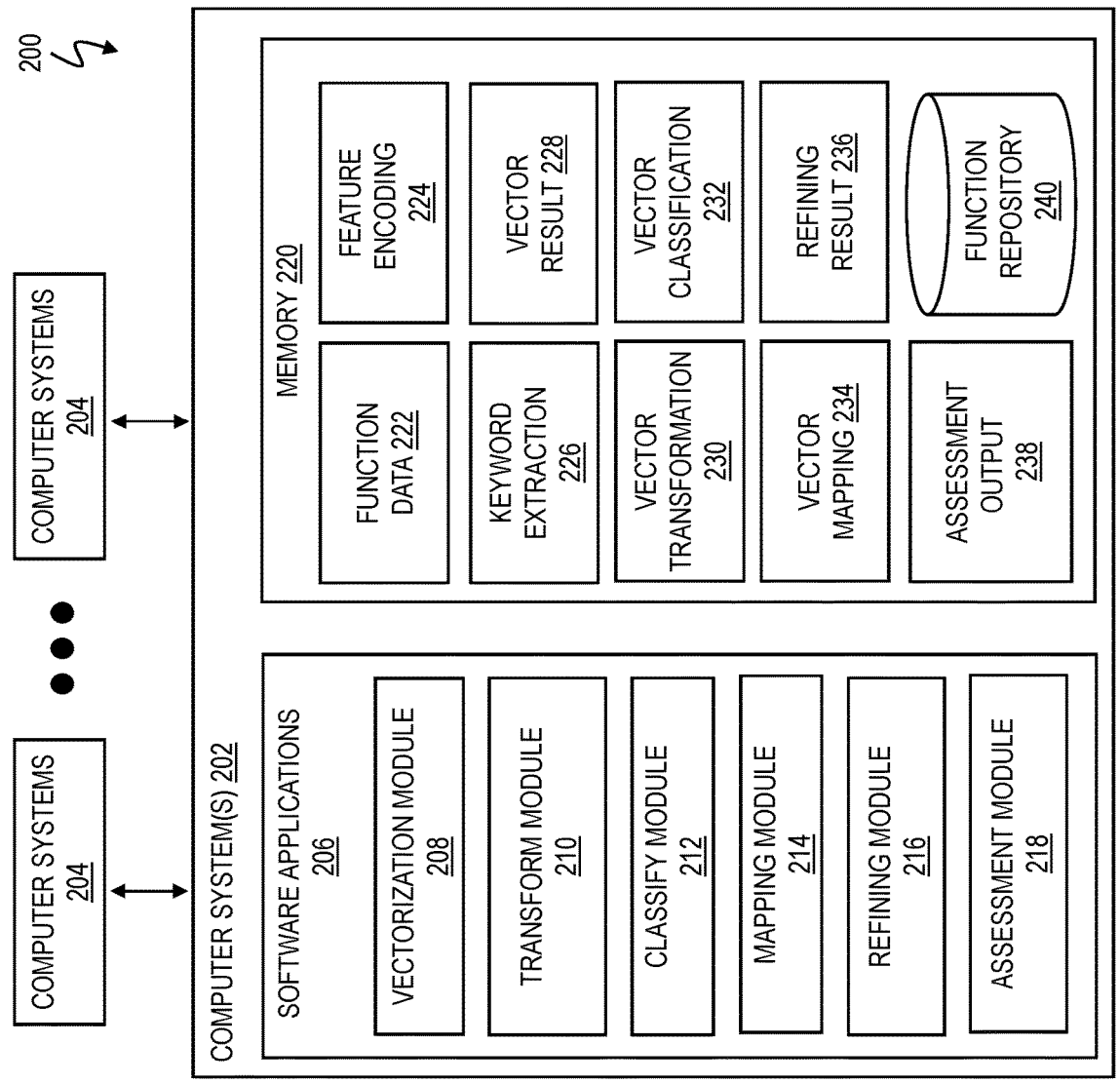
FIG. 2 is a block diagram of a system for evaluating the difficulty of a code migration in accordance with one or more embodiments of the present invention.

FIG. 2 is a block diagram of a system 200 for porting projects between platforms in accordance with one or more embodiments of the present invention. FIG. 2 depicts one or more computer systems 202 coupled to one or more computer systems 204 via a wired and/or wireless network. For example, computer system 202 can be representative of one or more cloud-based resources (e.g. remote computers, etc.) and computer systems 204 can be representative of numerous client (local) computers. One or more of the computer systems 202 can be configured to evaluate the difficulty of a code migration between a source platform and a target platform. Elements of the computer system 100 of FIG. 1 may be used in and/or integrated into computer systems 202 and computer systems 204. In some embodiments of the invention, computation is done direct at the local level. In other words, elements of the computer system 202 can instead (or in addition) be elements of the computer systems 204.

Figure 3:
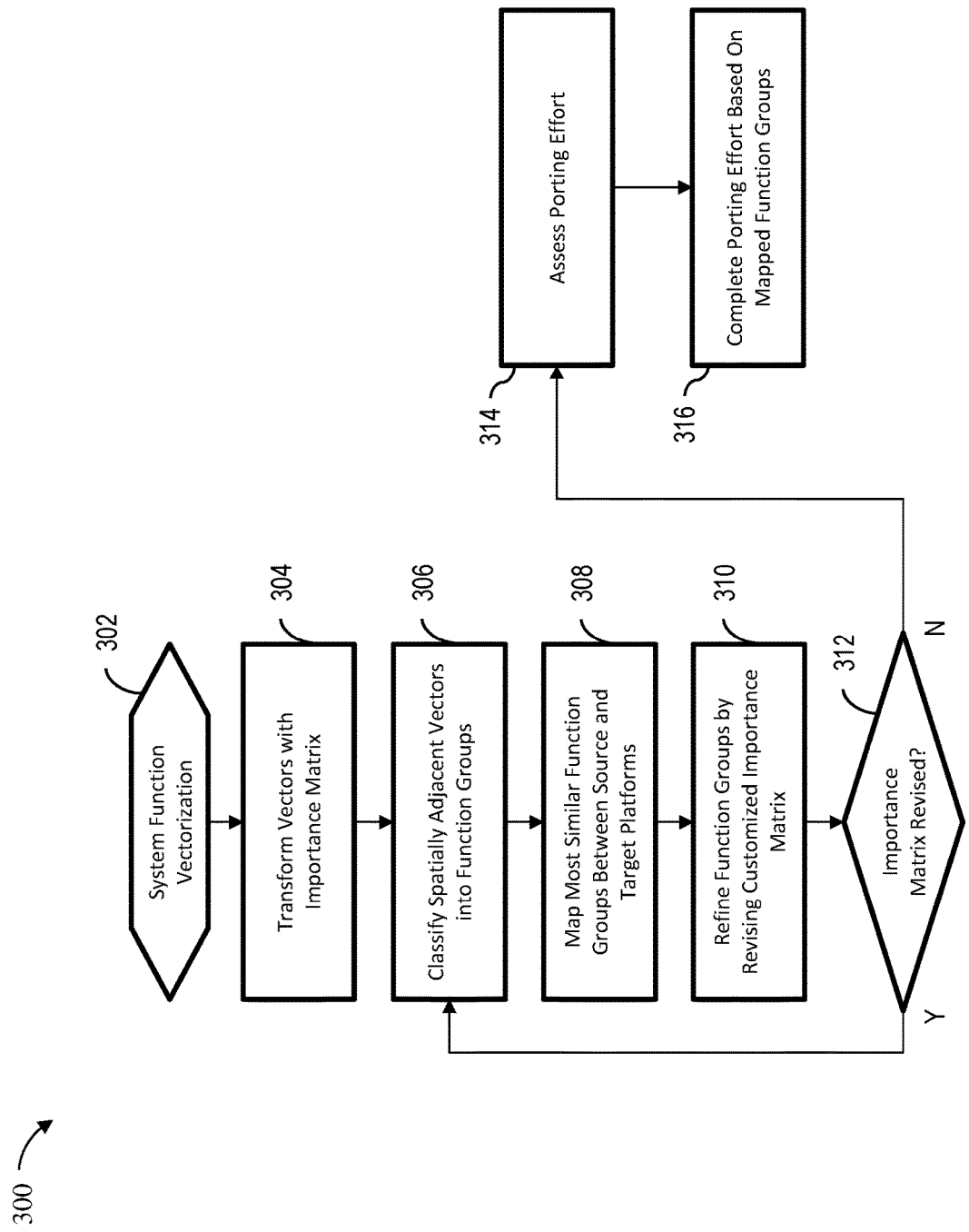
FIG. 3 is a block diagram of a dataflow for evaluating the difficulty of a code migration in accordance with one or more embodiments of the present invention.

One or more software applications 206 can include a vectorization module 208, a transform module 210, a classify module 212, a mapping module 214, a refining module 216, and an assessment module 218. The software applications 206 may utilize and/or be implemented as software 111 executed on one or more processors 101, as discussed in FIG. 1. Memory 220 of the computer systems 202 can store, for example, function data 222, feature encoding 224, keyword extraction 226, vector result 228, vector transformation 230, vector classification 232, vector mapping 234, refining result 236, assessment output 238, and a function repository 240 (e.g., codebase, API, annotations, etc.). A dataflow 300 of FIG. 3 illustrates interactions between various components of the software applications 206 and memory 220 of FIG. 2 for evaluating the efforts of a code migration (e.g., porting task) of a project between different platforms.

In some embodiments of the invention, the vectorization module 208 is configured to receive function data 222. The function data 222 can be retrieved from a preconfigured resource, such as a database (e.g., function repository 240). In some embodiments of the invention, the function data 222 can be provided by a user of the computer systems 202 and/or 204. The function data 222 can include the various elements of the function such as, for example, the function's name, parameters, return type, description, and body (e.g., sub functions). It is understood that other elements are possible and within the contemplated scope of the disclosure. In some embodiments of the invention, the vectorization module 208 is configured to construct a function's feature vector encoding each of the function's elements (block 302 in FIG. 3). In some embodiments of the invention, the return type and parameters elements (i.e., fields) are vectorized according to a feature encoding 224. In some embodiments of the invention, the name, description, and body fields are vectorized according to a keyword extraction 226.

Figure 4:
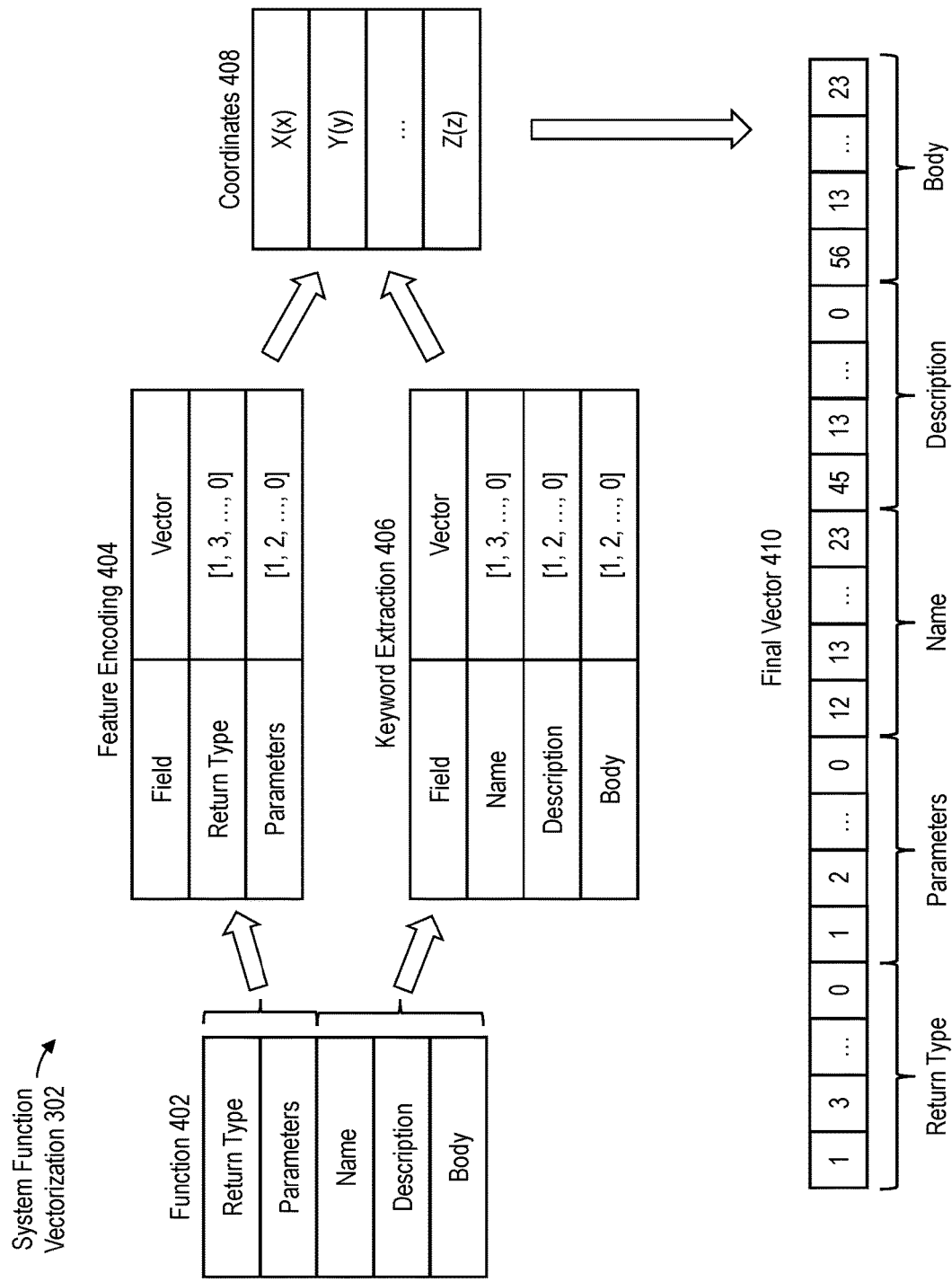
FIG. 4 illustrates an example system function vectorization in accordance with one or more embodiments of the present invention.
Figure 5:
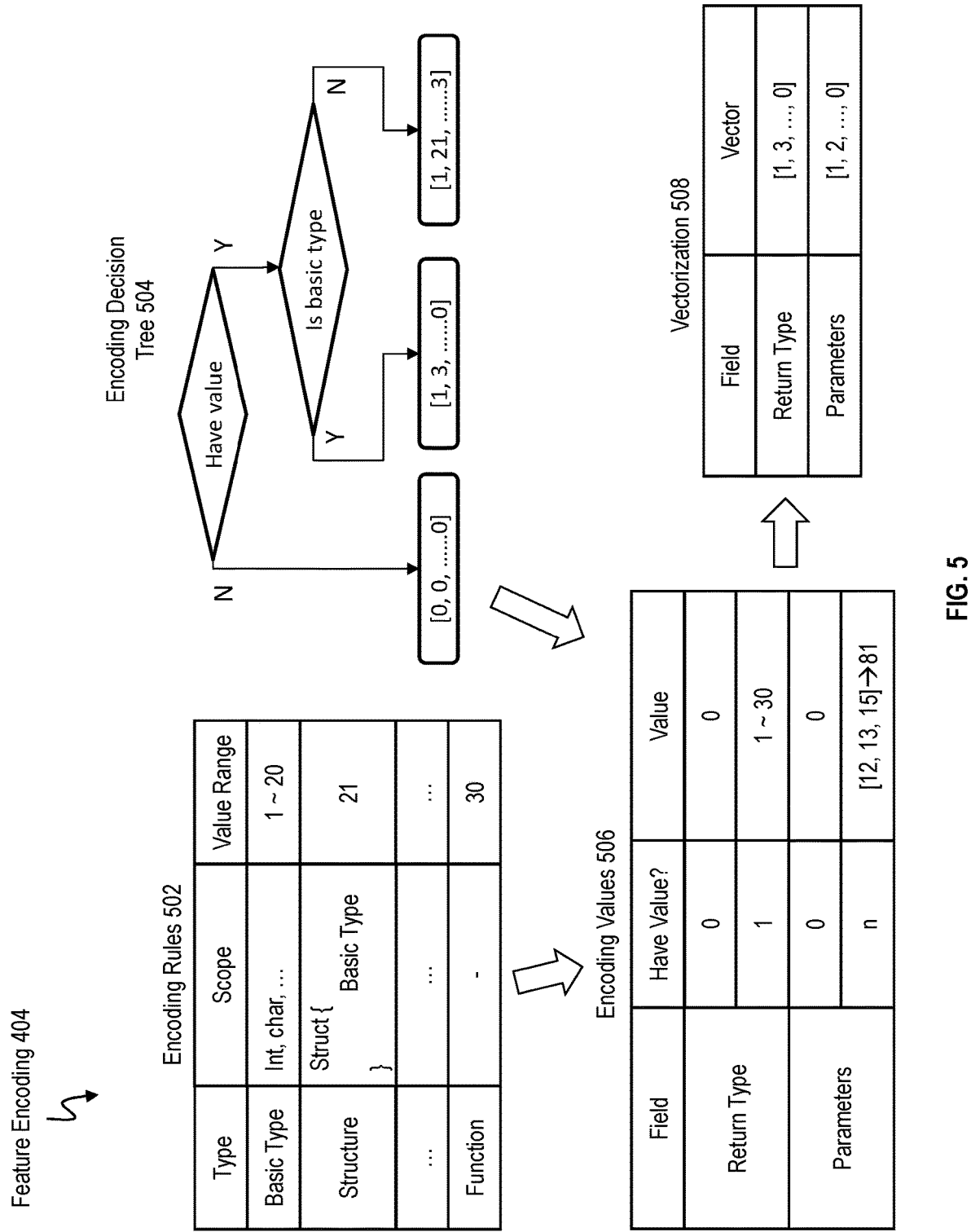
FIG. 5 illustrates an example feature encoding in accordance with one or more embodiments of the present invention.
Figure 6:
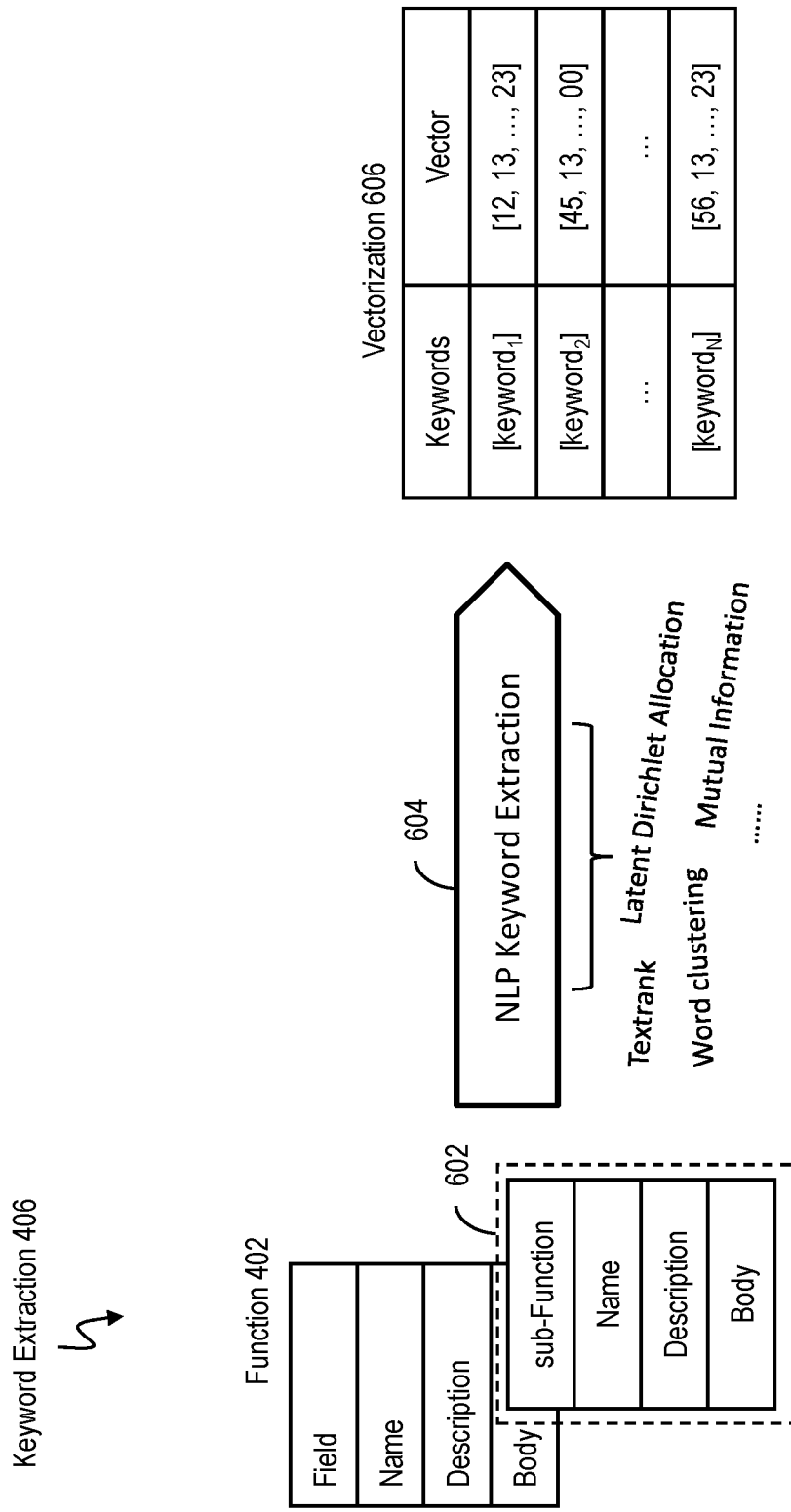
FIG. 6 illustrates an example keyword extraction in accordance with one or more embodiments of the present invention.

FIGS. 4, 5, and 6 provide a more detailed review of system function vectorization 302, feature encoding 224, and keyword extraction 226 respectively. In some embodiments of the invention, the vectorized functions can be stored as a vector result 228 in the memory 220.

As shown in FIG. 4, various fields of a function 402 can be transformed into a set of vectors (vectorized) using a combination of feature encoding 404 and keyword extraction 406. In some embodiments of the invention, the Return Type and Parameters fields are vectorized using feature encoding 404 while the Name, Description, and Body fields are vectorized using keyword extraction 406. In some embodiments of the invention, the complete set of vectors is translated into a set of coordinates 408 by hashing the vectors and considering the result as a point in a 5-dimensional space. For example, the fields of the function 402 can be encoded as a point 5-dimensional space using MD5 (or any other hashing technique) having the value: [MD5(VectorOf(Return Type)), MD5 (VectorOf(Parameters)), MD5 (VectorOf(NameKeyword)), MD5(VectorOf(DescriptionKeyword)), MD5(VectorOf(BodyKeyword))]. In this manner, the set of coordinates 408 can define a final vector 410 that integrates the various field's vector data into a single vector.

In some embodiments of the invention, predetermined encoding rules can be used to translate each element of a function 402 into a value. FIG. 5 illustrates an example feature encoding 404 according to encoding rules 502. For example, the "Int" type can be assigned a value "1" while the "Function" type can be assigned a value "30". It is understood that the various types and corresponding values in FIG. 5 are merely illustrative and that other types and values are contemplated. In some embodiments of the invention, all possible features of a function can be mapped to a predetermined value using encoding rules. For some fields (e.g., Parameters) there can be two or more values. For example, a single function can include arbitrarily many parameters. In some embodiments of the invention, the "n" values corresponding to the "n" parameters are stored as a sequence (or vector) rather than as a single value. In some embodiments of the invention, a final value can be assigned to each field having multiple values by using a predetermined hashing method.

In some embodiments of the invention, an encoding decision tree 504 can be leveraged to assign different encoding rules according to the input of the respective field. For example, types having no value (e.g., a "set" function without a Return Type) can be assigned a predetermined vector (e.g., [0, 0, . . . , 0]), while basic and non-basic types can be assigned vectors using other encoding rules. In some embodiments of the invention, a vectorization process is used to translate the final values of each field into a respective vector. For example, we can place the two final values of "Return Type" and "Parameters" as the first two segments of the final vector 410 as shown in FIG. 4. Consider that, for a specific language such as C, the number of basic types and keywords is fixed. For C specifically, the number is 13. Assume that int=1, char=2, float=3, . . . structure=13, etc. (these values are illustrative and other mappings are possible). Continuing with this example, a return types' encoded value could be: [1, 3], where the "1" means the function has a return value and the "3" encodes a "float" as the return type. A parameter's value could be: [3, 2, 1, 13], where the "3" means the field has 3 parameters, and the 2, 1, and 13 encode the various parameter values. So, for the final vector in this example the first two segments can be: [1, 3, 3, 2, 1, 13].

In some embodiments of the invention, a keyword extraction technique, such as natural language processing (NLP) extraction, can be used to generate a word embedding for each element of a function 402. FIG. 6 illustrates an example keyword extraction 406 according to an NLP keyword extraction 604. NLP keyword extraction 604 can leverage any known extraction techniques, such as, for example, text rank, word clustering, latent Dirichlet allocation, mutual information, etc., to identify one or more keywords within each respective field (e.g., Name, Description, Body) of a function 402.

In some embodiments of the invention, all of the sentences related to a function (function text, annotations, documentation, etc.) are evaluated to extract keywords. In some embodiments of the invention, keywords can be extracted using known NLP related modeling techniques, such as Multi-Task Deep Neural Networks (MT-DNN) and Bidirectional Long Short-Term Memory (Bi-LSTM). In some embodiments of the invention, extracted keywords can be translated into values using predetermined encoding rules. For example, the keyword "store" in the "Description" field can be translated to the value 7. In some embodiments of the invention, a field can include two or more values which can be collapsed into a vector by sequentially listing the values. For example, the values 45, 1, . . . , 6 can be stored as a vector: [45, 1, . . . , 6]. In some embodiments of the invention, each keyword is assigned to a vector using a predetermined encoding rule.

In some embodiments of the invention, the NLP related modeling techniques are implemented as one or more neural network(s) which can be trained on data (e.g., prior functions having known keywords) to generate weights for one or more internal (hidden) layers of the neural network. The trained neural network can then be used to make a keyword prediction based on a new function. The neural network could be implemented, for example, as a Long Short-Term Memory network (LSTM), although other neural networks such as deep neural networks (DNNs) and recurrent neural networks (RNNs) are within the contemplated scope of the disclosure.

LSTM networks are a type of artificial recurrent neural network (RNN) architecture used in the field of deep learning. Unlike standard feedforward neural networks, LSTM makes use of feedback connections. Advantageously, LSTM networks can not only process single data points (such as images), but also entire sequences of data (such as text or video). For example, LSTM networks are applicable to tasks such as unsegmented, connected handwriting recognition, speech recognition, and anomaly detection in network traffic or IDSs (intrusion detection systems).

In some embodiments of the invention, the transform module 210 is configured to receive the vector result 228 from the vectorization module 208. In some embodiments of the invention, the transform module 210 is configured to transform predefined vectors (e.g., vector result 228) using an importance matrix (block 304 in FIG. 3). The importance matrix transforms an input vector into an output vector using various scaling factors (e.g., importance metrics) that scale each component (e.g., coordinate) of the input vector depending on its relative importance. An example importance matrix 702 is illustrated in FIG. 7.

As shown in FIG. 7, the importance matrix 702 includes the various fields of the associated function (e.g., Return Type, Parameters, . . . , Body) and the respective values of each coordinate in the incoming vector (e.g., the vector result 228, denoted $Vector_{IN}$). Each coordinate can be scaled based on an importance metric to generate an output vector (e.g., $Vector_{OUT}$).

The scaling values (denoted "importance") of the importance matrix 702 can be randomly initialized or preconfigured. In some embodiments of the invention, the scaling values are preconfigured to leverage some meta-information known about the porting task, the source platform, and/or the target platform. For example, in some embodiments of the invention, all of the system functions can be classified into known system function families (e.g., File Manipulation, Process Control, Device Manipulation, Information Maintenance, Communication, and Protection) and the definition of the function's "Description" field (sub-vector) can reflect those function families. In this scenario it is reasonable to give significant value (e.g., overleverage) to the Description field within the importance matrix 702. Similarly, less value can be given to one or more other fields. Note that while some exemplary scaling values are provided in FIG. 7 for ease of discussion, it is understood that the scaling values can each be set independently to any value between 0 and 1. The output vector (Vector$_{OUT}$) can then be generated from the randomly initialized or preconfigured scaling values. In some embodiments of the invention, the output vector can be stored as a vector transformation 230 in the memory 220.

In some embodiments of the invention, the classify module 212 is configured to receive the vector transformation 230 from the transform module 210 and to place the vector transformation 230 into a common coordinate system with the respective vector transformations of the other functions within the scope of the porting project. In some embodiments of the invention, the classify module 212 is configured to classify spatially adjacent vectors into known function families for both the source platform and the target platform (step 306 in FIG. 3). An example spatial classification is illustrated in FIG. 8.

Figure 8:
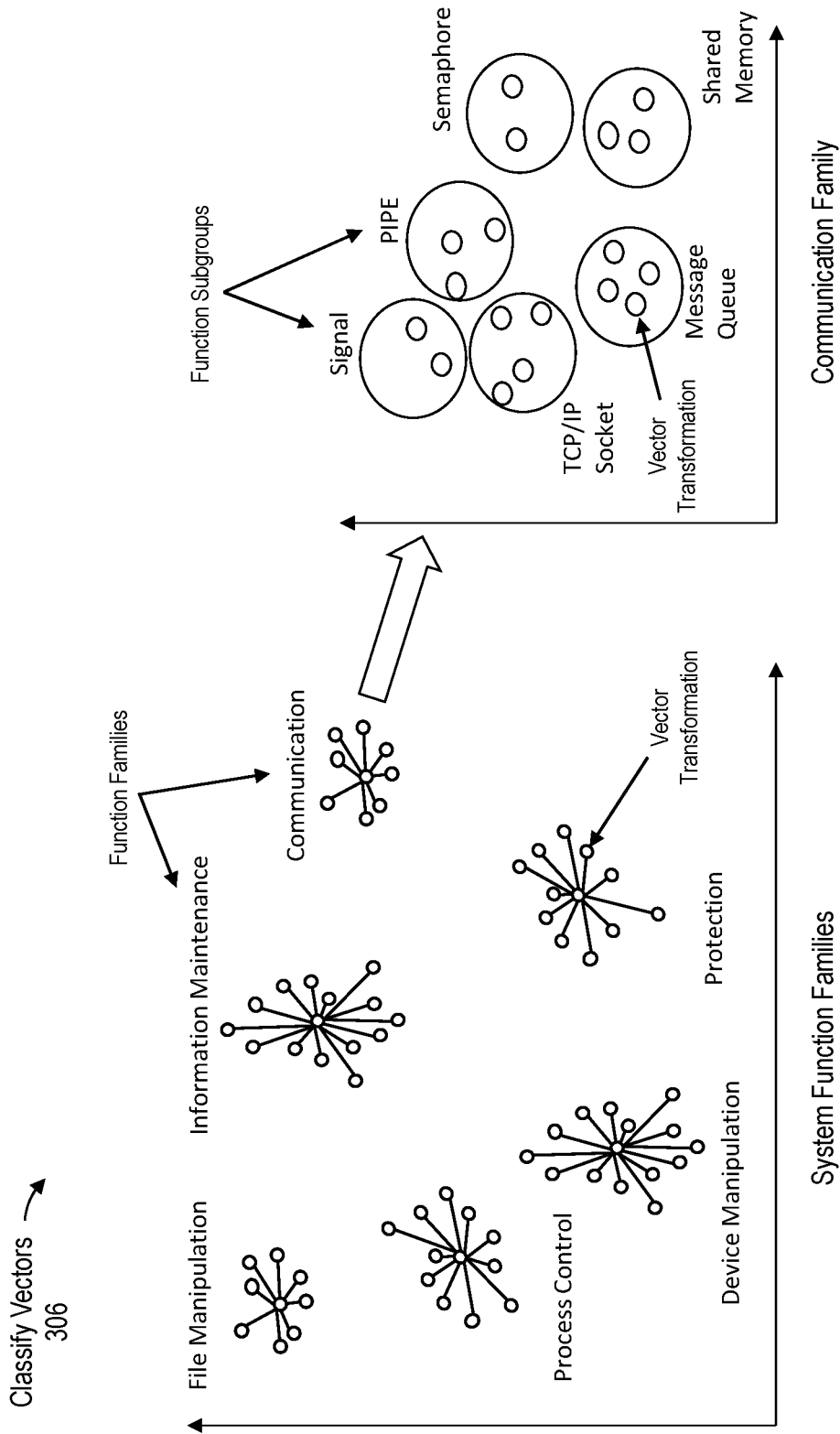
FIG. 8 illustrates an example vector classification in accordance with one or more embodiments of the present invention.

As shown in FIG. 8, the various vector transformations can be mapped to the known system function families (e.g., File Manipulation, Protection, etc.). The system function families can be mapped using known distance-based classification methods, such as, for example, K-Nearest Neighbor (KNN) using various known distance metrics (e.g., shortest Euclidean distance, Minkowski distance, Manhattan distance, Cosine distance, Jaccard distance, Hamming distance, etc.).

In some embodiments of the invention, each vector transformation can be mapped to a specific function subgroup within the respective system function family. For example, FIG. 8 depicts the detailed breakdown of the Communication family into various function subgroups (e.g., Signal, TCP/IP Socket, Shared Memory, etc.) and the mapping of a vector transformation to one of these subgroups. In some embodiments of the invention, each vector transformation is assigned to a subgroup using a known clustering method, for example, K-mean clustering. In some embodiments of the invention, the subgroup assignment can be stored as a vector classification 232 in the memory 220. This process can be repeated to generate separate function subgroup mappings for each of the source platform and the target platform functions.

Figure 9:
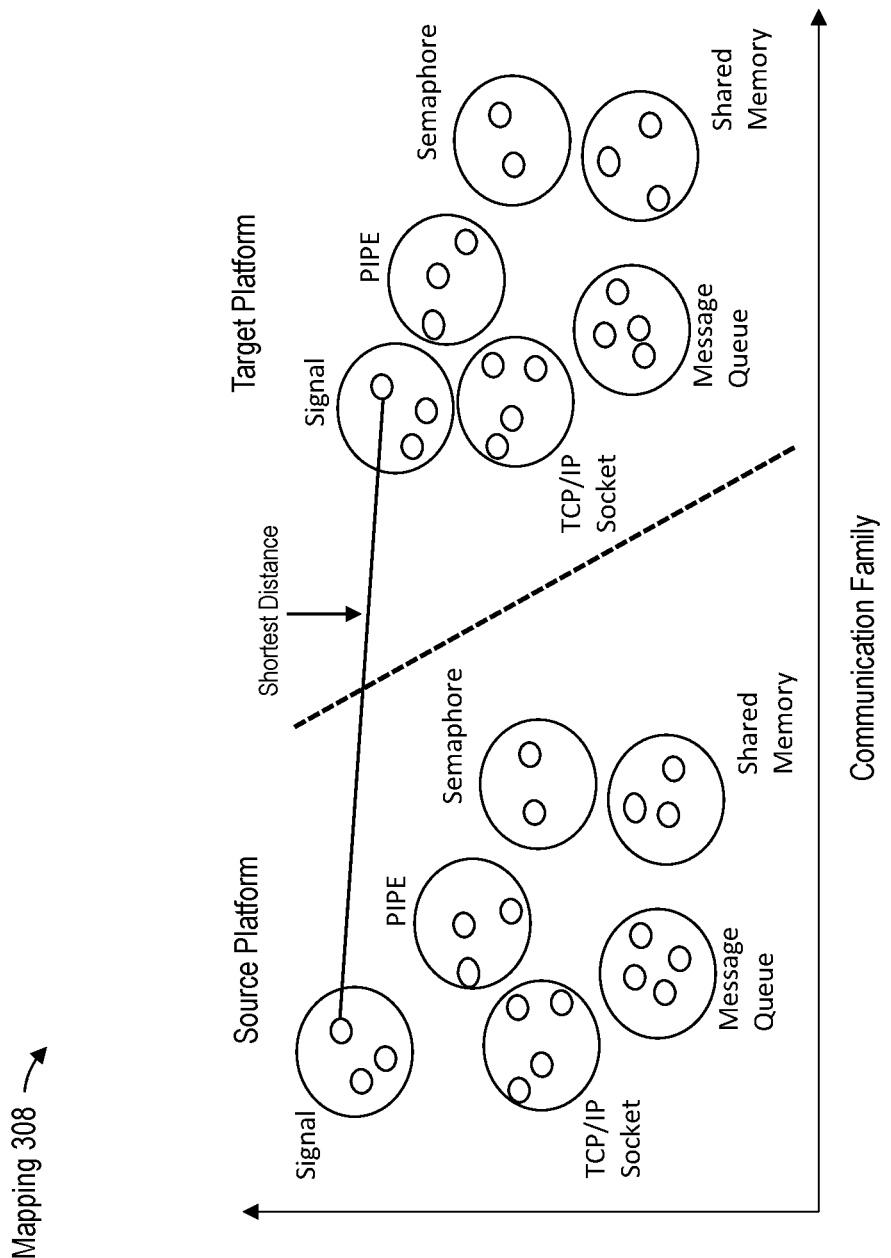
FIG. 9 illustrates an example mapping in accordance with one or more embodiments of the present invention.

In some embodiments of the invention, the mapping module 214 is configured to receive the vector transformation 230 from the classify module 212 and to map the most similar (e.g., shortest distance) function subgroups between source and target platforms (block 308 in FIG. 3). An example mapping from a source platform to a target platform for the Communication Family is illustrated in FIG. 9. In some embodiments of the invention, the center of each group (e.g., Signal, Shared Memory, etc.) is determined for each of the source and target platforms and the shortest distance (as measured from the center) between a subgroup in the source platform and a subgroup in the target platform define a mapping group. This process can be repeated for all subgroups. In some embodiments of the invention, there exists one or more groups in the source platform that do not map to a group in the target platform, and visa versa, within some predetermined distance threshold. In other words, there may be some subgroups in one platform whose minimize distance to any of the subgroups in the other platform are greater that some required distance.

While the subgroup breakdowns for the Communication Family in both the source platform and target platform are shown side-by-side for ease of illustration, it is understood that the coordinates are, in reality, superimposed over a common coordinate system (i.e., with a same origin). Consequently, the two "Signal" subgroups will have the shortest distance, even though the side-by-side representation obscures this information. In some embodiments of the invention, the mapping results can be stored as vector mapping 234 in the memory 220.

In some embodiments of the invention, the refining module 216 is configured to receive the vector mapping 234 from the mapping module 214 and to refine the function group assignments by revising the importance matrix if a statistical measure of comparison between random sampling points and real values within the mappings fail predetermined requirements (e.g., statistical similarity is below a predetermine threshold) (block 310 in FIG. 3). In this manner, the importance matrix (which can be randomly initialized) can be successively tweaked to improve the statistical similarity between the resultant vector mappings.

Figure 10:
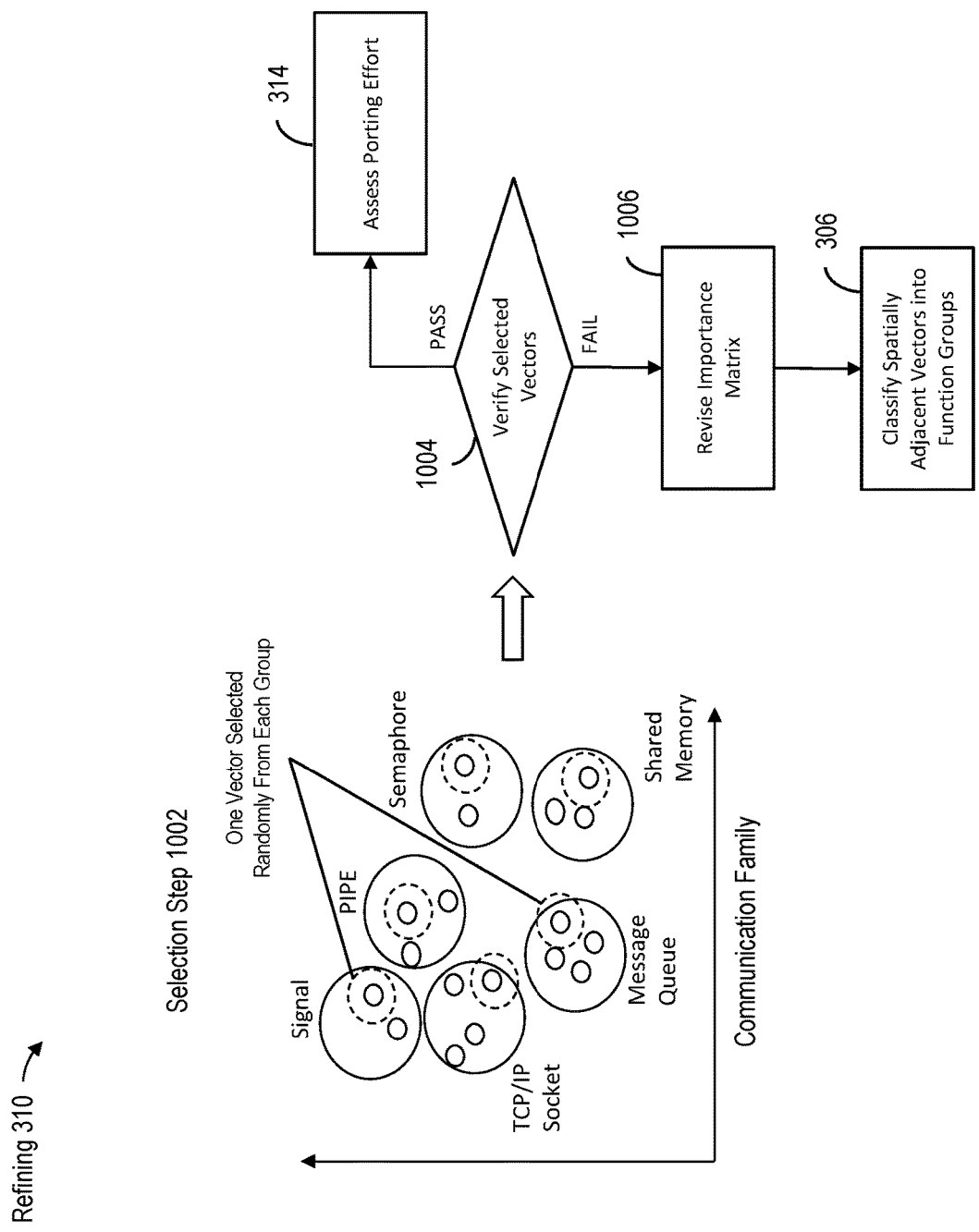
FIG. 10 illustrates an example matrix refining process in accordance with one or more embodiments of the present invention.

An example refining process is illustrated in FIG. 10. In some embodiments of the invention, one vector is randomly selected from each group in a selection block 1002. At block 1004, each randomly selected vector is verified by comparing the function's attributes to the attributes of other functions in the respective subgroup to determine whether the mapping for the vector is correct. Using the Communication Family of functions as an example for function verification, consider that the various function subgroups (e.g., Signal, TCP/IP Socket, Shared Memory, etc.) are known to most systems. Consequently, we can build a list for each Communication Family function subgroup for the Source Platform. With the list, it becomes straightforward to identify (via comparison) whether a randomly selected vector is acceptable or not for the group (i.e., within the list). A predetermined threshold (e.g., 51%, 70%, 90%, 99%, etc.) of the percent of acceptable vectors can be used here to determine whether a refinement is needed.

If most vectors are accepted (i.e., PASS), then the refining process is complete (importance matrix revised=NO at block 312) and the process continues to assessing the porting effort (block 314 of FIG. 3). Otherwise (i.e, FAIL), proceed to block 1006 and revise the importance matrix (importance matrix revised=YES at block 312). In some embodiments of the invention, the status of the importance matrix (revision=YES or NO) can be stored as refining result 236 in the memory 220.

The importance matrix can be revised by adjusting one or more of the importance factors. In some embodiments of the invention, the importance factors are re-initialized randomly. In some embodiments of the invention, the importance factors are shifted according to a predetermined schedule (e.g., increase all factors less than 0.5 by 10% and decrease all factors more than 0.5 by 10%, etc.). Once the importance matrix is revised, the process continues to (re) classifying spatially adjacent vectors into function groups (block 306 of FIG. 3). The overall process between classification and refining (blocks 306 to 312 in FIG. 3) can be repeated as many times as necessary.

In some embodiments of the invention, the assessment module 218 is configured to receive the refining result 236 (i.e., PASS) from the refining module 216. In some embodiments of the invention, the assessment module 218 is further configured to assess the porting effort required between the source platform and the target platform (block 314 in FIG. 3). An exemplary porting assessment is illustrated in FIG. 11.

Recall that the main effort in evaluating a porting task is finding out whether any system specific functions of the source OS are missing or mismatched in the target system OS. There are four possible scenarios: (1) the system specific functions are the same; (2) the system specific functions are equivalent; (3) the system specific functions are mismatched; or (4) the system specific functions are wholly missing in the target OS.

Figure 11:
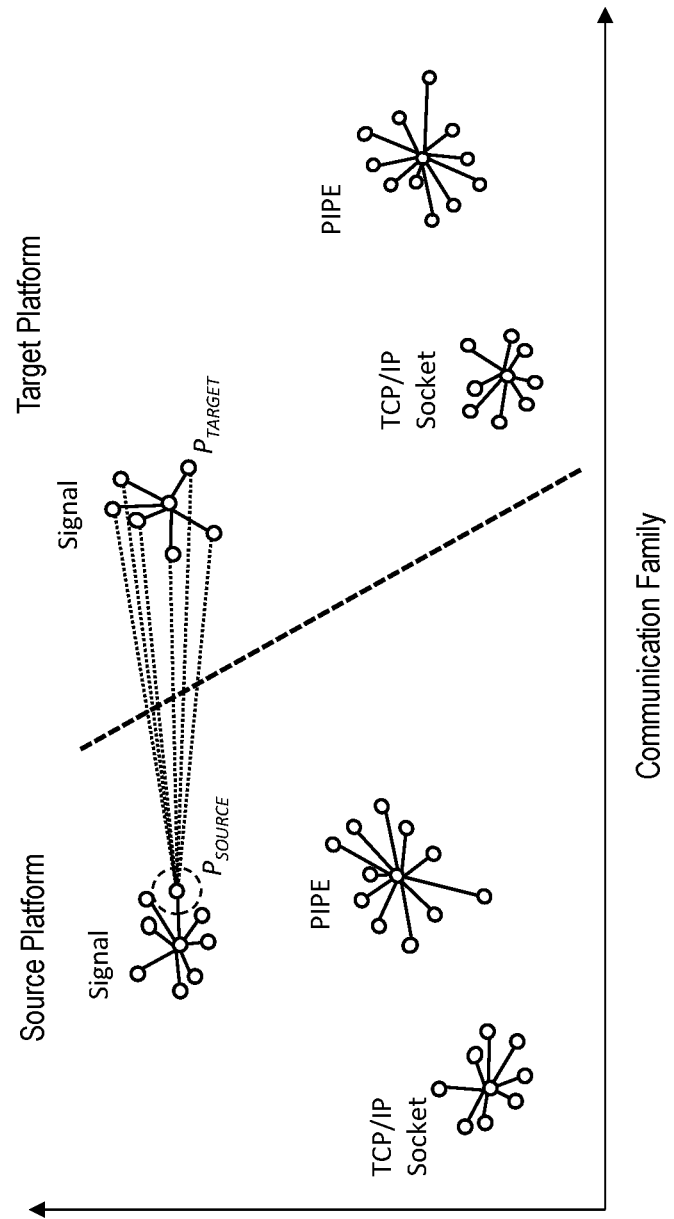
FIG. 11 illustrates an example porting assessment in accordance with one or more embodiments of the present invention.

As shown in FIG. 11, given a point (vector) of the source platform ($P_{SOURCE}$), a corresponding point ($P_{TARGET}$) can found on the target platform having a minimum distance to $P_{SOURCE}$. In some embodiments of the invention, a distance (e.g., Euclidean distance, Minkowski distance, Manhattan distance, Cosine distance, Jaccard distance, Hamming distance, etc.) is computed between $P_{SOURCE}$ and each vector in the target platform and the target vector having the minimum distance is selected (i.e., calculate min_dis=min(dis ($P_{SOURCE}$, $P_{TARGET\_1}$), dis($P_{SOURCE}$, $P_{TARGET\_2}$), . . . , dis($P_{SOURCE}$, $P_{TARGET\_N}$) for N vectors in the target platform).

Once the minimum distance is known, the point $P_{SOURCE}$ can be assigned a porting assessment result. In some embodiments of the invention, if the minimum distance is zero (min_dis=0), then $P_{TARGET}$ is the existing mapping point for $P_{SOURCE}$. If the minimum distance is within a predetermined tolerance of 0 (min_dis≈0, e.g., within 2%, 5%, etc.), then $P_{TARGET}$ is the equivalent mapping point for $P_{SOURCE}$. If the minimum distance is greater than a predetermined threshold (min_dis>threshold), then $P_{SOURCE}$ has no mapping point on the target platform. Otherwise (min_dis<threshold), $P_{TARGET}$ and $P_{SOURCE}$ are mismatching functions. In this manner, each point $P_{SOURCE}$ can be assigned to one of the four possible porting scenarios (i.e., same, equivalent, mismatched, missing).

In some embodiments of the invention, the assessment module 218 is further configured to generate a porting difficulty report. An exemplary porting difficulty report 1202 is illustrated in FIG. 12. In some embodiments of the invention, the output of the porting analysis can be stored as an assessment output 238 in the memory 220. As shown in FIG. 12, the porting difficulty report 1202 can include a complete breakdown of the porting scenarios (i.e., same, equivalent, mismatched, missing) for each function in the source platform. The report can further include an identifier for each source function-target function pair (e.g., "func A-func A") and a recommendation based on the porting scenario for the respective source function. In some embodiments of the invention, the report can include various metrics such as the number (count) or percentage of each of the possible porting scenarios over the entire list of source functions. In this manner, a user can quickly review the report to assess the porting difficulty.

If the porting difficulty is tolerable using, for example, any predetermined metrics such as the number of mismatched and missing functions is below some threshold, the process continues to block 316 and the porting effort is completed. In some embodiments of the invention, the porting effort is completed using recommendations from the porting difficulty report 1202.

Figure 13:
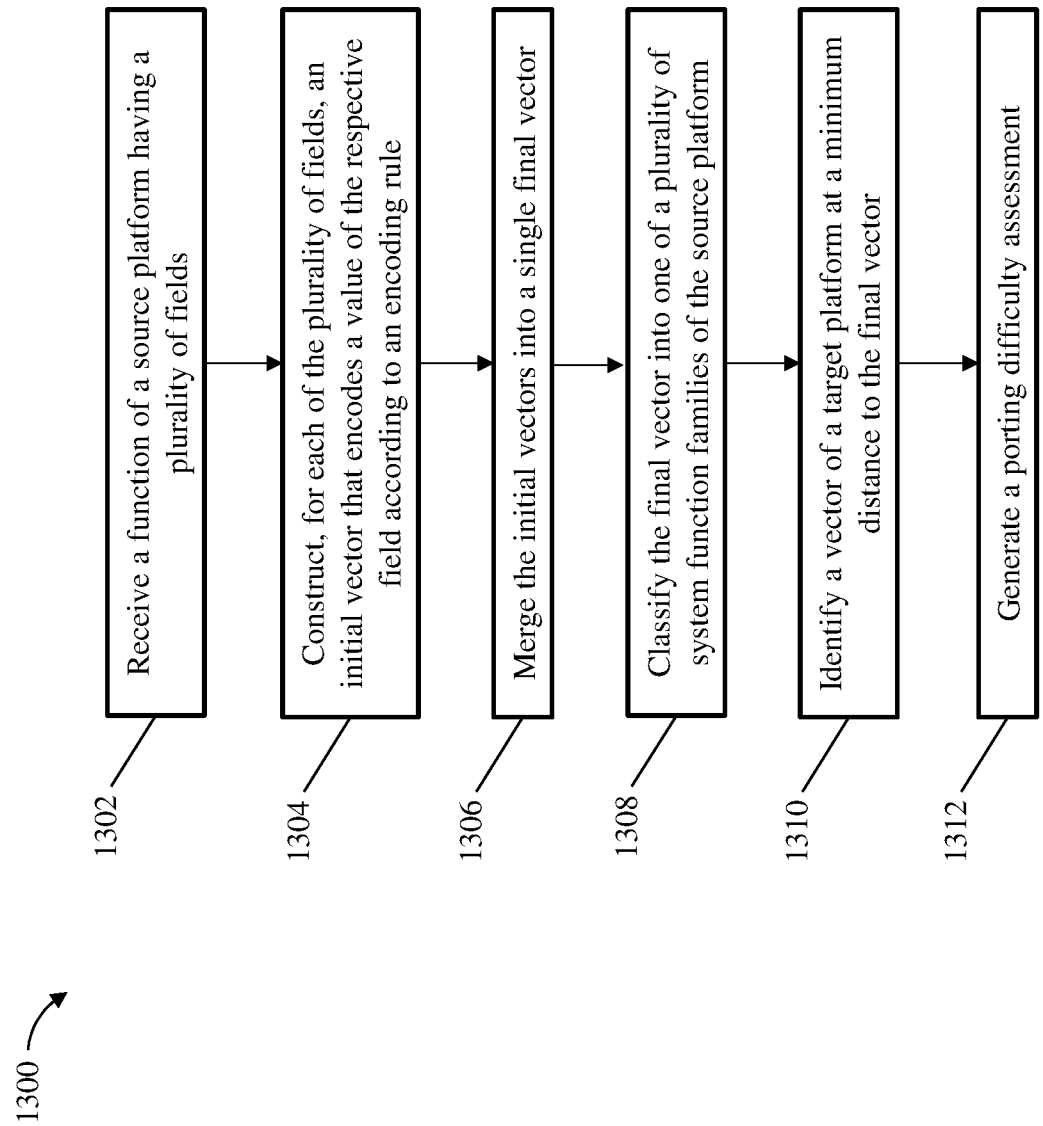
FIG. 13 is a flowchart in accordance with one or more embodiments of the present invention.

Referring now to FIG. 13, a flowchart 1300 for efficiently evaluating the difficulty of a code migration (e.g., porting task) is generally shown according to an embodiment. The flowchart 1300 is described in reference to FIGS. 1-12 and may include additional blocks not depicted in FIG. 13. Although depicted in a particular order, the blocks depicted in FIG. 13 can be rearranged, subdivided, and/or combined. At block 1302, a function of a source platform is received. The function can include a plurality of fields. In some embodiments of the invention, the plurality of fields include a return type, one or more parameters, a name, a description, and a body.

At block 1304, an initial vector is constructed for each of the plurality of fields that encodes a value of the respective field according to an encoding rule. At block 1306, the initial vectors are merged into a single final vector.

At block 1308, the final vector is classified into one of a plurality of system function families of the source platform. In some embodiments of the invention, one or more function subgroups are generated for each of the plurality of system function families. In some embodiments of the invention, the final vector belongs to a first subgroup of the source platform.

At block 1310, a vector of a target platform at a minimum distance to the final vector is identified. In some embodiments of the invention, identifying the vector of the target platform at a minimum distance to the final vector includes calculating a center of each of the one or more function subgroups and identifying a second subgroup of the target platform having a minimum distance (as measured from the center) to the first subgroup. In some embodiments of the invention, identifying the vector further includes calculating, for each vector in the second subgroup, a distance to the final vector and identifying the vector in the second subgroup having a minimum distance to the final vector.

At block 1312, a porting difficulty assessment is generated. The assessment can include a difficulty in porting a project that includes the function between the source platform and the target platform based at least in part on the minimum distance. In some embodiments of the invention, the assessment indicates whether the function of the source platform exists in the target platform, is equivalent to a function in the target platform, or is mismatched to a function in the target platform.

The method can further include transforming the final vector based on an importance matrix. In some embodiments of the invention, the importance matrix includes, for each element of the final vector, a scaling factor. In some embodiments of the invention, the method includes a refining process whereby a point in each subgroup of the one or more function subgroups is randomly selected and then verified against the currently associated subgroup. In some embodiments of the invention, in response to one or more selected points not belonging to the respective subgroup, the scaling factors of the importance matrix can be modified.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
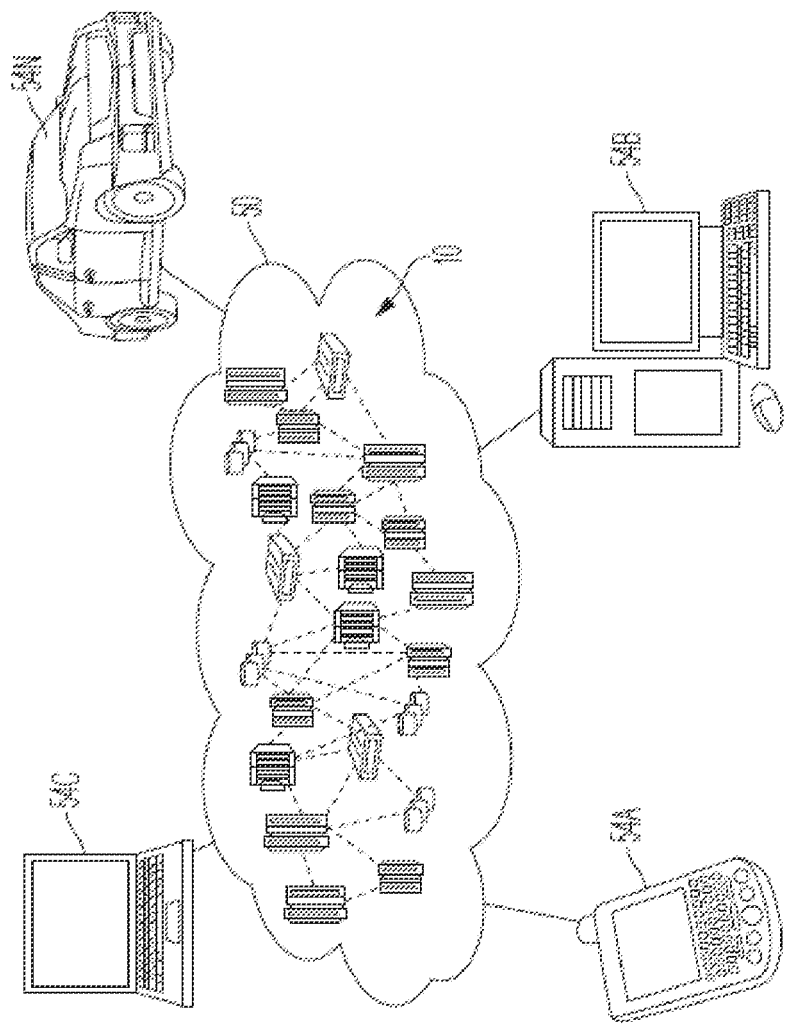
FIG. 14 depicts a cloud computing environment according to one or more embodiments of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 15:
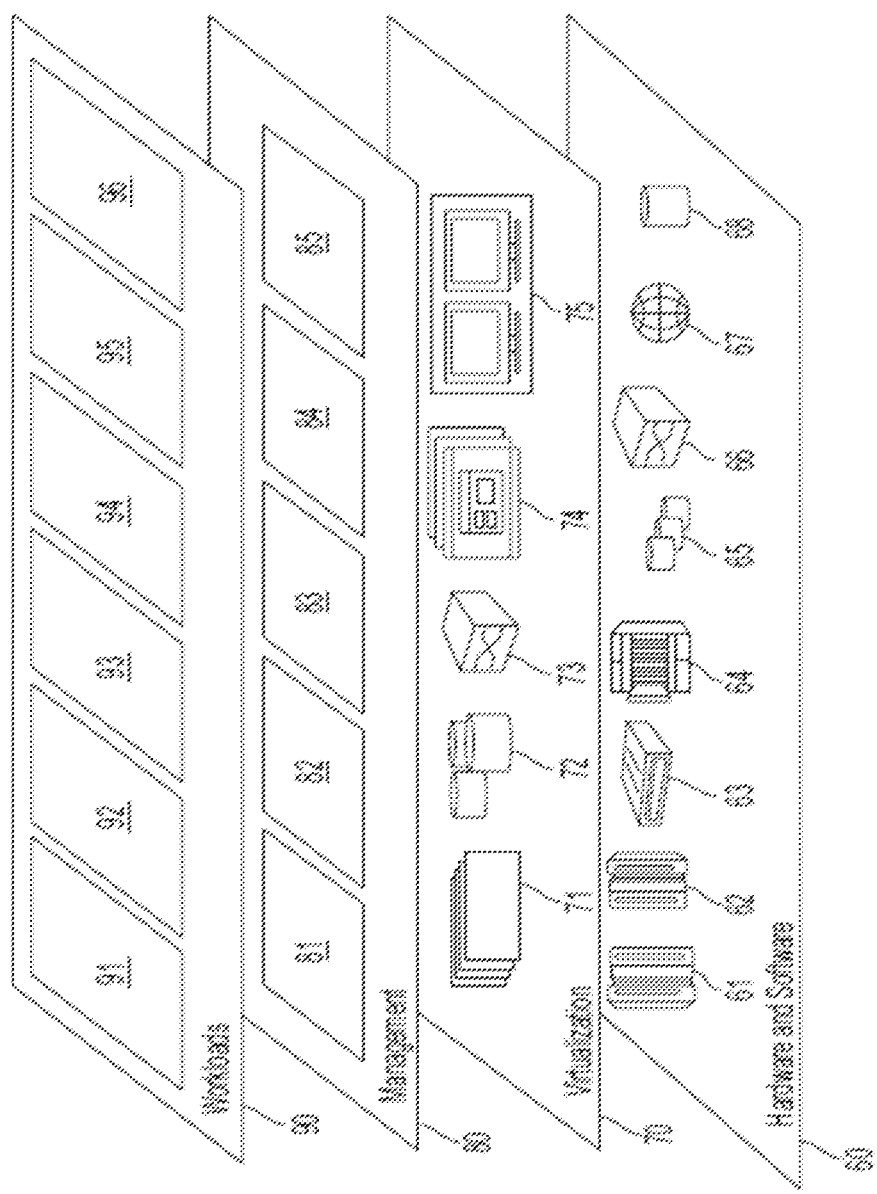
FIG. 15 depicts abstraction model layers according to one or more embodiments of the present invention.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 206 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving a function of a source platform, the function comprising a plurality of fields;
constructing a plurality of initial vectors, the plurality of initial vectors encoding a plurality of values for the plurality of fields according to encoding rules;
merging the plurality of initial vectors into a single final vector;
classifying the final vector into one of a plurality of system function families of the source platform;
identifying a vector of a target platform at a minimum distance to the final vector; and
generating an assessment comprising a difficulty in porting a project comprising the function between the source platform and the target platform based at least in part on the minimum distance.

2. The computer-implemented method of claim 1, wherein the plurality of fields comprise a return type, one or more parameters, a name, a description, and a body.

3. The computer-implemented method of claim 1, further comprising generating, for each of the plurality of system function families, one or more function subgroups, wherein the final vector belongs to a first subgroup of the source platform.

4. The computer-implemented method of claim 3, wherein identifying the vector of the target platform at a minimum distance to the final vector comprises:
calculating a center of each of the one or more function subgroups;
identifying a second subgroup of the target platform having a minimum distance to the first subgroup;
calculating, for each vector in the second subgroup, a distance to the final vector; and
identifying the vector in the second subgroup having a minimum distance to the final vector.

5. The computer-implemented method of claim 3, further comprising transforming the final vector based on an importance matrix comprising, for each element of the final vector, a scaling factor.

6. The computer-implemented method of claim 5, further comprising:
randomly selecting a point in each subgroup of the one or more function subgroups;
determining whether each selected point belong to the associated subgroup; and
in response to one or more selected points not belonging to the respective subgroup, modifying the scaling factors of the importance matrix.

7. The computer-implemented method of claim 1, wherein the assessment indicates whether the function of the source platform exists in the target platform, is equivalent to a function in the target platform, or is mismatched to a function in the target platform.

8. A system comprising:
a memory having computer readable instructions; and
one or more processors for executing the computer readable instructions, the computer readable instructions controlling the one or more processors to perform operations comprising:
receiving a function of a source platform, the function comprising a plurality of fields;
constructing a plurality of initial vectors, the plurality of initial vectors encoding a plurality of values for the plurality of fields according to encoding rules;
merging the plurality of initial vectors into a single final vector;
classifying the final vector into one of a plurality of system function families of the source platform;
identifying a vector of a target platform at a minimum distance to the final vector; and
generating an assessment comprising a difficulty in porting a project comprising the function between the source platform and the target platform based at least in part on the minimum distance.

9. The system of claim 8, wherein the plurality of fields comprise a return type, one or more parameters, a name, a description, and a body.

10. The system of claim 8, wherein the operations further comprise generating, for each of the plurality of system function families, one or more function subgroups, wherein the final vector belongs to a first subgroup of the source platform.

11. The system of claim 10, wherein identifying the vector of the target platform at a minimum distance to the final vector comprises:
calculating a center of each of the one or more function subgroups;
identifying a second subgroup of the target platform having a minimum distance to the first subgroup;
calculating, for each vector in the second subgroup, a distance to the final vector; and
identifying the vector in the second subgroup having a minimum distance to the final vector.

12. The system of claim 10, wherein the operations further comprise transforming the final vector based on an importance matrix comprising, for each element of the final vector, a scaling factor.

13. The system of claim 12, wherein the operations further comprise:
randomly selecting a point in each subgroup of the one or more function subgroups;
determining whether each selected point belong to the associated subgroup; and
in response to one or more selected points not belonging to the respective subgroup, modifying the scaling factors of the importance matrix.

14. The system of claim 8, wherein the assessment indicates whether the function of the source platform exists in the target platform, is equivalent to a function in the target platform, or is mismatched to a function in the target platform.

15. A computer program product comprising a non-transitory computer readable storage medium having program instructions embodied therewith, the program instructions executable by one or more processors to cause the one or more processors to perform operations comprising:
receiving a function of a source platform, the function comprising a plurality of fields;
constructing a plurality of initial vectors, the plurality of initial vectors encoding a plurality of values for the plurality of fields according to encoding rules;
merging the plurality of initial vectors into a single final vector;
classifying the final vector into one of a plurality of system function families of the source platform;
identifying a vector of a target platform at a minimum distance to the final vector; and generating an assessment comprising a difficulty in porting a project comprising the function between the source platform and the target platform based at least in part on the minimum distance.

16. The computer program product of claim 15, wherein the plurality of fields comprise a return type, one or more parameters, a name, a description, and a body.

17. The computer program product of claim 15, wherein the operations further comprise generating, for each of the plurality of system function families, one or more function subgroups, wherein the final vector belongs to a first subgroup of the source platform.

18. The computer program product of claim 17, wherein identifying the vector of the target platform at a minimum distance to the final vector comprises:
   calculating a center of each of the one or more function subgroups;
   identifying a second subgroup of the target platform having a minimum distance to the first subgroup;
   calculating, for each vector in the second subgroup, a distance to the final vector; and
   identifying the vector in the second subgroup having a minimum distance to the final vector.

19. The computer program product of claim 17, wherein the operations further comprise transforming the final vector based on an importance matrix comprising, for each element of the final vector, a scaling factor.

20. The computer program product of claim 19, wherein the operations further comprise:
   randomly selecting a point in each subgroup of the one or more function subgroups;
   determining whether each selected point belong to the associated subgroup; and
   in response to one or more selected points not belonging to the respective subgroup, modifying the scaling factors of the importance matrix.

* * * * *